United States Patent [19]

Bolson, Sr.

[11] Patent Number: 4,712,094
[45] Date of Patent: Dec. 8, 1987

[54] SELF-ORIENTING PASSIVE MARKER STRUCTURE

[75] Inventor: John H. Bolson, Sr., Conyers, Ga.

[73] Assignee: Minnesota Mining and Manufacturing Company, St. Paul, Minn.

[21] Appl. No.: 868,784

[22] Filed: May 29, 1986

[51] Int. Cl.[4] .............................................. G08B 13/18
[52] U.S. Cl. ..................................... 340/572; 324/329
[58] Field of Search ................ 340/572; 324/329, 326, 324/327, 328, 67

[56] References Cited

U.S. PATENT DOCUMENTS 3,836,842  9/1974  Zimmermann et al. ............ 324/329
4,119,908  10/1978  Cosman et al. ...................... 324/67
4,292,590  9/1981  Wilson ................................ 324/260

Primary Examiner—Glen R. Swann, III
Attorney, Agent, or Firm—Donald M. Sell; James A. Smith; Robert L. Marben

[57] ABSTRACT

A passive marker including a tuned circuit having an inductance and a capacitance carried by a carrier enclosed within a hollow sphere that is partially filled with a liquid to freely float the carrier. The inductance includes a coil which, when the carrier is floating, positions the axis of the coil so it is closer to the vertical than the horizontal. The passive marker is of a type that is buried relative to portions of utilities such as gas, telephone, water and power lines, for use in locating such portions when necessary.

6 Claims, 4 Drawing Figures

SELF-ORIENTING PASSIVE MARKER STRUCTURE

FIELD OF THE INVENTION

The invention presented herein relates to passive marker devices which are selectively placed relative to various portions of buried utilities such as gas, telephone, water and power lines, for use in locating such portions when necessary. The invention relates more particularly to marker structures with an inductance-capacitance tuned circuit wherein the tuned circuit is automatically positioned for optimum operation relative to a detecting unit that is used for detecting the presence of the marker.

BACKGROUND OF THE INVENTION

Prior art electronic marker devices of the type having an inductance-capacitance tuned circuit are known wherein the tuned circuit is made with an air-core inductance provided by a flat, wire coil connected in parallel with a capacitor or with a capacitor connected to a wire coil wound on core element that has a length that is substantially longer than the diameter of the core. Optimum operation of such marker requires the coil to be positioned so the axis of the coil is vertical. This presents a problem, particularly if the marker is of the air-core type having a small diameter, since a marker of this type, which will have a generally flat, small diameter housing, is sometimes merely tossed into a trench when a utility line is being installed with its final orientation being unpredictable since the trench is filled after the marker has been put in the trench. While this problem can be minimized by careful manual placement of such a marker, one cannot be certain that those involved in placement of the markers are aware of the need for a desired orientation for the markers. A marker having a coil that is wound on a core requires the core to be positioned vertically for optimum operation. Such positioning of the marker requires manual insertion of the marker in a utility trench with such positioning being subject to disruption when the trench is filled with dirt. In the case of the marker having a coil wound on a core, a solution to the positioning problem has been sought which involves the use of a holder that is tied or strapped to the utility line. The holder has a tapered hole for receiving the marker which is oriented so the winding core is vertical when the marker is placed in the tapered hole. This solution is objectionable because of the time required for placement and the fact that the utility line or cable to which it is attached may distort the electromagnetic field the tuned circuit produces when it is being detected reducing the distance at which it can be detected.

SUMMARY OF THE INVENTION

A marker of the tuned circuit type constructed in accordance with the present invention provides a solution to the problem of establishing the desired optimum positioning of the tuned circuit in that the tuned circuit is automatically positioned with a desired orientation and provides such positioning in a manner such that the position is not subject to being altered by some event that may occur subsequent to placement of the marker. A passive marker made in accordance with the invention includes an inductance-capacitance tuned circuit wherein the inductance is provided by a winding or coil having an axis; a hollow sphere and a buoyant carrier, which carries the tuned circuit, disposed within the hollow sphere, the buoyant carrier carrying the tuned circuit floating freely when the hollow sphere is partially filled with a liquid. The tuned circuit is carried by the buoyant carrier so the axis of the winding of the inductance is closer to the vertical then the horizontal when the buoyant carrier with the tuned circuit is floating freely. It is preferred that the axis of the winding of the inductance be vertical when the buoyant carrier and tuned circuit is floating freely within the hollow sphere.

A passive marker that is so constructed can be tossed into or placed in a utility trench when the liquid is present in the sphere without any concern regarding the orientation of the sphere since the buoyant carrier carrying the tuned circuit, which is free floating within the sphere, will determine the position of inductance winding or coil to to provide a desired positioning of the tuned circuit of the marker.

BRIEF DESCRIPTION OF THE DRAWING

The invention presented herein will be further understood by reference to the accompanying drawing wherein.

DETAILED DESCRIPTION

Figure 1:
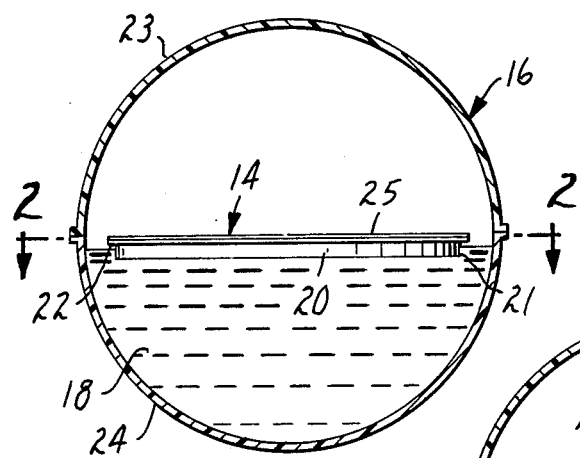
FIG. 1 is a section view of a hollow sphere showing a free floating carrier for a tuned circuit positioned within the sphere.
Figure 2:
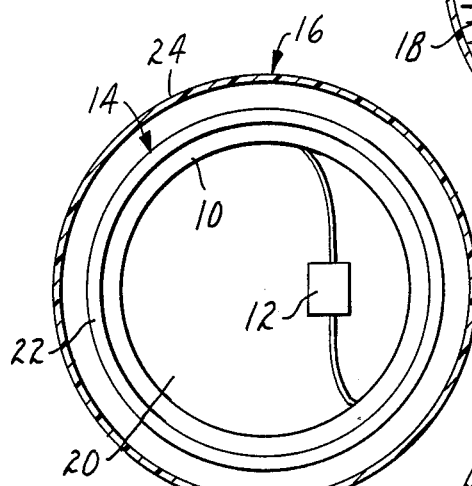
FIG. 2 is a section view taken along line 2—2 of FIG. 1.

Referring the the drawing, FIGS. 1 and 2 disclose one embodiment of the invention wherein a tuned circuit, including an air-core inductance 10 with a capacitor 12 connected in parallel with the inductance, is carried by a buoyant carrier 14 with such combination enclosed in a spherical housing 16, the housing 16 containing a quantity liquid 18, such as water, sufficient to cause the carrier 14 to float freely within the housing 16.

It is the function of the buoyant carrier 14 to carry the tuned circuit in such a manner that the carrier and tuned circuit combination, when it is free floating within the housing 16, causes the axis of the wire coil that provides the inductance 10 to assume a desired position with respect to the horizontal. The optimum position is with such axis vertical and in any event closer to the vertical than the horizontal.

In the case of the embodiment shown in FIGS. 1 and 2, the inductance 10 is provided by a coil of insulated wire having an air core, the coil presenting a generally flat profile. This being the case, the carrier 14 used in the structure of FIGS. 1 and 2 is disc shaped with the tuned circuit disposed within the carrier 14. The diameter of the coil for the inductance 10 is slightly less than the inner diameter of the carrier 14 so there is an even distribution of the weight of the coil about the inner periphery of the carrier 14 causing the coil to be disposed horizontally when the carrier 14 and tuned circuit float on the liquid 10. With the coil disposed horizontally, its axis will be vertically disposed to provide the optimum position for the coil of the inductance 10.

The carrier 14 of FIGS. 1 and 2 can be formed with a circular base member 20 that is cup-shaped. The base member 20 has a flat central portion at the periphery of which is an integral upstanding rim or edge 21 having an outwardly extending rim 22. The tuned circuit is placed in this cup-shaped base member 20 with a flat circular cover member 25 positioned as cover for the member 20. The cover member 25 is fused to the rim 22 using vibration or spin welding techniques. The cover member 25 can also be fused to the rim 22 by ultrasonic welding techniques. Materials for the carrier 14 can be any of a number of well known plastic materials such as polyvinylchloride, polyethylene or acrylonitrile-butadiene-styrene, for example.

The sphere 16 can be formed from two identical hemispheres 23 and 24 formed from a suitable plastic material such as high density polyethylene. The hemispheres are formed with a small outwardly extending flange to provide a surface at which the two hemispheres can be fused by the use of ultrasonic vibration or spin welding techniques. After the carrier 14 has been positioned within the sphere 16 and the hemispheres 23 and 24 forming the sphere have been fused together, a measured amount of liquid 18 is introduced into the sphere 16 via a hole (not shown) which is closed after the liquid is introduced. Water can be used as a suitable liquid. The sphere 16 need only have a diameter slightly greater than the diameter of the carrier 14 when a liquid 18 level is used that positions the free floating carrier 14 to float at the diameter for the sphere 16.

Figure 3:
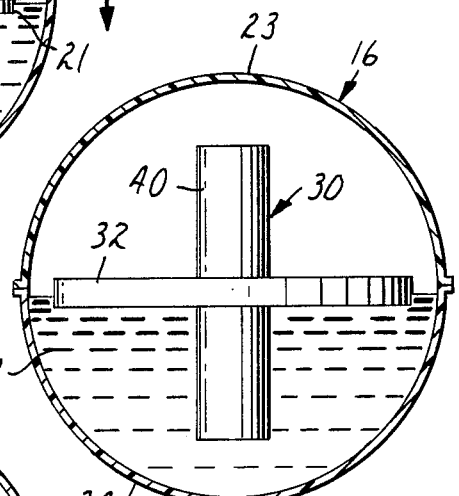
FIG. 3 is similar to FIG. 1 wherein a different free floating carrier and tuned circuit combination is shown.
Figure 4:
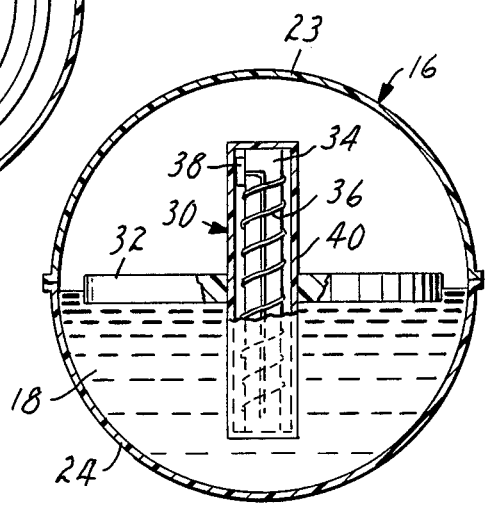
FIG. 4 is similar to FIG. 3 with an outer protective enclosure for the tuned circuit portion partially removed.

FIGS. 3 and 4 disclose another embodiment of the invention that is like the embodiment shown in FIGS. 1 and 2, except that the carrier 14 and tuned circuit combination are constructed differently. Parts in FIGS. 3 and 4 corresponding to the same parts as have been described in connection with FIGS. 1 and 2 are identified using the same reference numerals as are used in FIGS. 1 and 2.

The structure in FIGS. 3 and 4 includes a sphere 16, constructed using two hemispheres 23 and 24 in the same manner as described for sphere 16 of FIGS. 1 and 2, a quantity of liquid 18, a tuned circuit structure 30 and a carrier 32 for the tuned circuit structure 30. The tuned circuit structure 30 includes an inductance provided by a ferrite core 34 about which an insulated wire is wound to form a winding or coil 36. The ends of the wire for the winding or coil 36 are connected to a capacitor 38. The structure 30 is completed by inserting the ferrite core 34, winding 36 or coil and capacitor 38 assembly in one end of a tube 40 which is closed at the other end with the open end of the tube 40 then closed off with a cap which is fused to the tube 40 using spin welding techniques.

The carrier 32 for the tuned circuit is formed from a circular, flat piece of buoyant material such as styrofoam in which a centrally located opening is formed for receiving the tuned circuit structure 30 to position the tuned circuit structure 30 so it extends from both sides of the carrier 32. The tuned structure 30 is secured to the carrier 32 in a suitable manner such as by a wedge (not shown) inserted between the structure 30 and the carrier 32 or by use of a suitable adhesive. The heavier of the two portions of the tuned circuit structure 30 extending from the carrier 32 is received in the liquid 18 that is introduced into the sphere 16 after the carrier 32 and tuned circuit structure 30 has been positioned in the sphere 16 and the two hemispheres 23 and 24 making up the sphere 16 have been fused together. With the tuned circuit structure 30 centrally located in carrier 32, the carrier 32 floats level with the surface of liquid 18 causing the axis of the winding or coil 36 to be vertical to provide the optimum position for the winding or coil 36 for detection of the marker after it is buried.

The passive marker devices that have been described are usable as passive markers in carrying out the method for locating buried markers as described in U.S. Pat. No. 4,119,908 to Armond Cosman et al.

While the devices as described are directed to the attainment of an optimum position for the coil used in the tuned circuit, it should be understood that a device constructed so that the axis of the coil positioned by the freely floating carrier for the tuned circuit is closer to being vertical than horizontal is considered as being constructed according to the teachings of this invention.

While only two embodiments of the invention have been described in connection with the drawing, it will be understood that various modifications may be made to such embodiments and it is intended to cover in the appended claims all such modifications as fall within the true spirit and scope of the invention.

I claim:

1. A passive marker including;
   an inductance-capacitance tuned circuit wherein said inductance includes a coil having an axis;
   a hollow sphere partially filled with a liquid; and
   a buoyant carrier carrying said tuned circuit and floating freely in said liquid for positioning said axis of said coil closer to the vertical than the horizontal when said buoyant carrier is floating freely in said liquid.

2. A passive marker according to claim 1 wherein said tuned circuit is enclosed in said buoyant carrier.

3. A passive marker according to claim 1 wherein said coil is a flat, air-core coil and said buoyant carrier includes a cup-shaped member in which said coil is positioned.

4. A passive marker according to claim 1 wherein said inductance includes a core about which said coil is wound.

5. A passive marker according to claim 4 wherein said core and coil are carried by said carrier with said core and coil extending through said carrier.

6. A passive marker according to claim 5 wherein said core and coil extending through said carrier has a portion on one side of said carrier that is heavier than the portion on the other side of said carrier.

* * * * *